(12) United States Patent
Afzali-Ardakani et al.

(10) Patent No.: US 7,504,132 B2
(45) Date of Patent: *Mar. 17, 2009

(54) SELECTIVE PLACEMENT OF CARBON NANOTUBES ON OXIDE SURFACES

(75) Inventors: Ali Afzali-Ardakani, Ossining, NY (US); James Bowler Hannon, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 807 days.

This patent is subject to a terminal disclaimer.

(21) Appl. No.: 11/044,885

(22) Filed: Jan. 27, 2005

(65) Prior Publication Data
US 2006/0165896 A1    Jul. 27, 2006

(51) Int. Cl.
*B05D 5/00* (2006.01)

(52) U.S. Cl. .................. 427/256; 427/258; 264/29.1

(58) Field of Classification Search .......... 427/258, 427/256; 505/1; 438/780, 408; 156/230
See application file for complete search history.

(56) References Cited

U.S. PATENT DOCUMENTS

| | | | | |
|---|---|---|---|---|
| 5,196,396 | A * | 3/1993 | Lieber | 505/460 |
| 6,225,239 | B1 * | 5/2001 | Ohno et al. | 438/780 |
| 6,866,801 | B1 * | 3/2005 | Mau et al. | 264/29.1 |
| 2004/0063199 | A1 | 4/2004 | Takayama et al. | |
| 2004/0071968 | A1 * | 4/2004 | Kyrlidis et al. | 428/408 |
| 2004/0163758 | A1 * | 8/2004 | Kagan et al. | 156/230 |

OTHER PUBLICATIONS

Valentin et al., High-density selective placement methods for carbon nanotubes, 2002 (no month available), Microelectrical Engineering, 61-62, p. 492.*

Folkers et al., Self-Assembled Monolayers of Long-Chain Hydroxamic Acids on the native Oxides of Metals, 1994 (no month available), Langmuir, 11, p. 813-820.*

Folkers et al., Self-Assembled Monolayers of Long-Chain Hydroxamic Acids on the Native Oxide Metals, 1995, Langmuir, vol. 11, pp. 813-824.*

Valentin et al., High-density selective placement methods fr carbon nanotubes, 2002, Microelectronic Engineering, 61-62, pp. 491-496.*

E. Valentin et al., "High-Density Selective Placement Methods for Carbon Nanotubes", Microelectronic Engineering, 61-62 (2002), pp. 491-496.

J. Liu et al., "Controlled Deposition of Individual Single-Walled Carbon Nanotubes on Chemically Functionalized Templates", Chemical Physics Letters, 303 (1999), pp. 125-129.

Kamins, T.I., et al., "Chemically vapor deposited Si nanowires nucleated by self-assembled Ti islands on patterned and unpatterned Si substrates" Mar. 2002, p. 997, para 3.

* cited by examiner

*Primary Examiner*—Michael Barr
*Assistant Examiner*—Andrew Bowman
(74) *Attorney, Agent, or Firm*—Scully, Scott, Murphy & Presser, P.C.; Ido Tuchman, Esq.

(57) ABSTRACT

The present invention provides a method for the selective placement of carbon nanotubes on a particular surface. In particular, the present invention provides a method in which self-assembled monolayers formed on an unpatterned or patterned metal oxide surface are used to attract or repel carbon nanotubes from a dispersion containing the same. In accordance with the present invention, the carbon nanotubes can be attracted to the self-assembled monolayers so as to be attached to the metal oxide surface, or they can be repelled by the self-assembled monolayers bonding to a predetermined surface other than the metal oxide surface containing the self-assembled monolayers.

1 Claim, 6 Drawing Sheets

SELECTIVE PLACEMENT OF CARBON NANOTUBES ON OXIDE SURFACES

FIELD OF THE INVENTION

The present invention generally relates to the selective placement of carbon nanotubes on a particular surface. More particularly, the present invention provides a method in which self-assembled monolayers formed on a particular surface are used to attract or repel carbon nanotubes from a dispersion containing the same. The present invention also relates to the use of self-assembled monolayers of phosphonic acid on oxide surfaces for the selective placement of carbon nanotubes (CNTs).

BACKGROUND OF THE INVENTION

In the field of molecular electronics, few materials show as much promise as carbon nanotubes that comprise hollow cylinders of graphite that have a diameter of a few Angstroms. Nanotubes can be implemented in electronic devices, such as, for example, diodes and transistors, depending on the characteristics of the nanotube. Nanotubes are unique for their size, shape and physical properties. For example, carbon based nanotubes resemble a hexagonal lattice of carbon rolled into a cylinder.

Besides exhibiting intriguing quantum behaviors even at room temperature, nanotubes exhibit at least two important characteristics: a nanotube can be either metallic or semiconducting depending on its chirality, i.e., conformational geometry. Metallic nanotubes can carry an extremely large current density with constant resistivity. Semiconducting nanotubes can be electrically switched "on" or "off" as field effect transistors (FETs). Typically, semiconducting carbon nanotubes are used as the 'channel' in FETs. The two types may be covalently joined (i.e., sharing electrons). These characteristics point to nanotubes as excellent materials for making nanometer sized semiconductor circuits.

Figure 1:
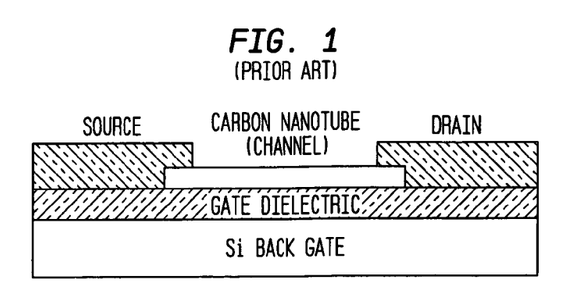
FIG. 1 is a pictorial representation (through a cross sectional view) illustrating a prior art back-gated field effect transistor.

The most common prior art method of fabricating carbon nanotube FETs starts with depositing nanotubes on an oxide thin film from a liquid suspension. Source and drain contacts are then formed lithographically on the nanotube. The oxide layer is the gate dielectric, and the bulk Si back-gates the device. A schematic of a typical prior art carbon nanotube FET is shown, for example, in FIG. 1.

The deposition of carbon nanotubes on an oxide surface, followed by lithographic patterning of the source and drain contacts, has been successfully used in the prior art for the construction of single carbon nanotube FETs. However, fabrication of integrated circuits from nanotubes requires the precise placement and alignment of large numbers of carbon nanotubes on a surface (e.g., spanning the source and drain contacts). E. Valentin, et al., "High-density selective placement methods for carbon nanotubes", Microelectronic Engineering, 61-62 (2002), pp. 491-496 disclose a method in which the adhesion of carbon nanotubes onto a $SiO_2$ surface is improved using aminopropyltriethoxysilane (APTS). In this prior art, APTS is employed to form a silanized surface on $SiO_2$ which is then used to selectively place the carbon nanotubes.

As known to those skilled in the art, $SiO_2$ and other oxides of non-metals are acidic oxides which form acids when combined with water. Such oxides are known to have low isoelectric points. The term "isoelectric point" is used throughout the present application to denote the pH at which the net charge on the oxide molecule is zero.

A drawback with the prior art process disclosed in the E. Valentin, et al. article is that the trialkoxysilane undergoes polymerization in solution and self-assembly must be carried out under controlled conditions excluding water. Additionally, APTS cannot be printed using conventional poly(dimethylsiloxane) (PDMS) stamps in contact printing because the solvents that are used for APTS could swell and destroy such stamps.

In view of the above, there is still a need for providing a method in which carbon nanotubes can be selectively placed which avoids the drawbacks with the selective placement process described in the prior art in which APTS is employed.

SUMMARY OF THE INVENTION

The present invention provides a method in which carbon nanotubes can be selectively placed on a predetermined surface that avoids the problems with the prior art APTS selective placement process which is mentioned in the background section of this application. In particular, the present invention provides a method in which self-assembled monolayers formed on a metal oxide surface (patterned or unpatterned) are used to attract or repel carbon nanotubes from a dispersion containing the same. In accordance with the present invention, the carbon nanotubes can be attracted to the self-assembled monolayers so as to be attached to the metal oxide surface, or they can be repelled by the self-assembled monolayers bonding to a predetermined surface other than the metal oxide surface containing the self-assembled monolayers. The method of the present invention does not include the formation of a silanized surface for forming the carbon nanotubes, as is the case in the prior art mentioned above. Instead, non-silylating monolayer precursors are employed for forming a non-silanized self-assembled monolayer.

In broad terms, the method of the present invention includes the steps of:

selectively placing a self-assembled monolayer on an upper metal oxide surface of a substrate;

depositing carbon nanotubes from a dispersion on said self-assembled monolayer or on a surface of said substrate not containing said self-assembled monolayer; and removing excess carbon nanotubes from said substrate.

The substrate of the present invention can include a metal oxide substrate or a non-metal oxide substrate such as $SiO_2$ which includes a patterned metal oxide layer located thereon. The self-assembled monolayers used in the present invention typically comprise monolayer precursors not including silyl groups such as, for example, organic phosphonic acids that include at least a phosphonic acid group ($—PO_3H_2$) which bonds to a metal oxide surface. The monolayers formed using these precursors do not include a silanized surface for selective carbon nanotube placement. In addition to organic phosphonic acids, the present invention also contemplates the use of organic hydroxamic acids as the monolayer precursor. The term "self-assembled monolayer precursor" is used throughout the present application to denote compounds that can form highly packed monolayers on a particular surface by electrostatic or covalent bonding to said surface.

One embodiment of the present invention relates to the selective placement of carbon nanotubes by prepatterning a metal oxide substrate with a self-assembled monolayer in such a way (e.g., microcontact printing) that a predetermined area is not coated with the self-assembled monolayer. Later, carbon nanotubes are formed in the predetermined area by depositing, through immersion or drop-casting from a solution.

Another embodiment of the present invention is the selective placement of carbon nanotubes on a metal oxide surface in a predetermined area of a substrate by selectively coating the predetermined area with a self-assembled monolayer and later immersing the substrate in a dispersion of carbon nanotubes. In this instance, carbon nanotubes are only formed on areas where the self-assembled monolayer is present. Still another embodiment of this invention is to prepattern the surface of an acidic oxide substrate such as silicon oxide with a metal oxide such as aluminum oxide or hafnium oxide such that a predetermined surface of the substrate is exposed. The substrate is then immersed in a solution capable of forming a self-assembled monolayer whereupon the self-assembled monolayer is only formed on the metal oxide. Solution deposition of carbon nanotubes results in placement of carbon nanotubes in the predetermined (silicon oxide) area of the substrate.

DETAILED DESCRIPTION OF THE INVENTION

The present invention, which provides a selective placement method for carbon nanotubes, will now be described in greater detail by referring to the drawings that accompany the present application. It is noted that the cross sectional views which illustrate various processing embodiments of the present invention are provided for illustrative purposes and thus they are not drawn to scale.

As stated above, the present invention provides a method whereby carbon nanotubes can be selectively placed on predetermined surfaces of a substrate. In particular, the present invention provides a method in which self-assembled monolayers formed on an unpatterned or patterned metal oxide surface are used to attract or repel carbon nanotubes from a dispersion containing the same. In accordance with the present invention, the carbon nanotubes can be attracted to the self-assembled monolayers so as to be attached to the metal oxide surface, or they can be repelled by the self-assembled monolayers bonding to a predetermined surface other than the metal oxide surface containing the self-assembled monolayers.

The term "carbon nanotube" is used throughout the present application to include a one-dimensional nanomaterial that has a hollow cavity with nanometer-sized diameters and much, much longer lengths. In other words, the carbon nanotubes have a high aspect ratio and quantum effects become important for these systems. The nanotubes that can be used in the present invention are single walled or multi-walled nanomaterials that typically have an outer diameter that is typically from about 0.8 nm to about 30 nm, with an outer diameter from about 1.0 nm to about 2.5 nm being more typical, and a length that is typically from about 5 nm to about 100 μm, with a length from about 10 nm to about 10 μm being more typical. In addition to having an outer diameter, the nanotubes that can be used in the present invention have an inner diameter that is typically from about 0.8 nm to about 15 nm, with an inner diameter from about 0.8 nm to about 2.5 nm being more highly typical. The nanotubes useful in the present invention are further characterized as having a high aspect ratio that is typically on the order of about 5 or greater, with an aspect ratio from about 5 to about 5000 being typical.

The nanotubes formed include a C-based nanomaterial that has a hexagonal lattice structure that is rolled up.

The carbon nanotubes used in the present invention are made using techniques well known to those skilled in the art. For example, the carbon nanotubes can be formed by laser ablation, chemical vapor deposition (CVD) of various organic materials, such as carbon monoxide, methane, and ethanol, and electrical discharge.

Figure 2A:
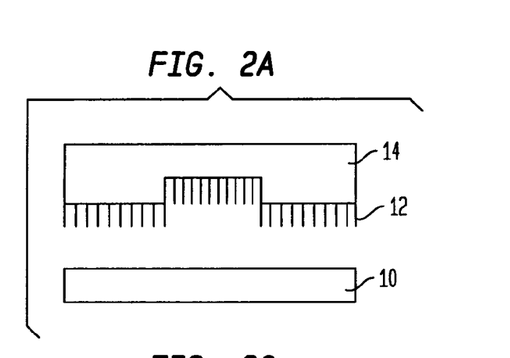
FIGS. 2A-2D are pictorial representations (through cross sectional views) illustrating a first embodiment of the present invention in which a microprinting scheme is used for the selective placement of carbon nanotubes.

Reference is first made to FIGS. 2A-2D which show one embodiment of the present invention. In the embodiment illustrated, a microprinting scheme is used for the selective placement of carbon nanotubes. Specifically, a metal oxide 10 is patterned with a self-assembled monolayer 12' using microcontact printing in which a stamp 14 containing the self-assembled monolayer 12 is used to the transfer self-assembled monolayer from the stamp to the metal oxide. FIG. 2A shows the initial sequence in which a stamp 14 containing the self-assembled monolayer 12 is provided and is brought into contact with a metal oxide 10 that includes at least one metal from group IVB, VB, VIB, VIIB, VIII or IIA (CAS version) of the Periodic Table of Elements. Illustratively, the metal oxide may comprise $Al_2O_3$, $HfO_2$, $TiO_2$, or $ZrO_2$. The metal oxide 10 may be located atop another dielectric material or a semiconducting material.

The stamp 14 is a patterned structure that is comprised of a conventional stamp material that can be inked with the self-assembled monolayer 12. Typically, the stamp 14 is comprised of poly(dimethylsiloxane), PDMS. The stamp 14 minus the self-assembled monolayer 12 is fabricated using techniques well known to those skilled in the microprinting art.

The self-assembled monolayer 12 is applied to the stamp 14 using a conventional inking process. Typically, the stamp 14 is inked with a monolayer precursor that is capable of (i) forming a self-assembled monolayer 12 on the surface of the stamp, (ii) forming a bond with basic oxides, e.g., metal oxides that have a high isoelectric point, and (iii) repelling carbon nanotube adhesion to the surface containing the same. Illustratively, one precursor material that satisfies criteria (i)-(iii) includes phosphonic acids that have the structural formula R—$PO_3H_2$, wherein R is an alkyl group containing from 1 to about 22, preferably from 1 to about 16 carbon atoms, or R is an aromatic or heteroaromatic containing from 1 to 12, preferably from 3 to 6, rings. The heteroaromatics can include one of the following as the heteroatom: nitrogen, sulfur, oxygen or combinations thereof. The aromatic or heteroaromatic may be substituted in some instances with an alkyl (straight chain or branched) containing from 1 to about 22 carbon atoms. More typically, the self-assembled monolayer 12 is comprised of an alkylphosphonic acid such as, for example, hexadecylphosphonic acid.

Another precursor material that satisfies criteria (i)-(iii) includes a hydroxamic acid of the general formula $R^1$—CONHOH wherein $R^1$ is an alkyl group containing from 1 to about 22, preferably from 1 to about 16 carbon atoms, or $R^1$ is an aromatic or heteroaromatic containing from 1 to 12, preferably 3 to 6, rings. The heteroaromatics can include one of the following as the heteroatom: nitrogen, sulfur, oxygen or combinations thereof. The aromatic or heteroaromatic may be substituted in some cases with an alkyl (straight chain or branched) containing 1 to about 22 carbon atoms. More typically, the self-assembled monolayer 12 is comprised of an alkylhydroxamic acid such as, for example, hexadecylhydroxamic acid.

It is noted that the present invention does not contemplate using silylation chemistry as is disclosed in the article to E. Valentin described in the background section of the present invention for the selective placement of carbon nanotubes.

The self-assembled monolayer 12 is formed onto the stamp 14 by applying, i.e., inking, a solution containing one of the above mentioned self-assembled monolayer precursors onto the stamp 14. The solution typically includes a sufficient concentration of the self-assembled monolayer precursor that is capable of forming said monolayer. Typically, from about 0.5 to about 50 mM, preferably from about 1 to about 10 mM, of said self-assembled monolayer precursor is present in the solution. The solution also contains at least a solvent that is capable of dissolving the self-assembled monolayer precursor. The solvent may comprise an alcohol such as, for example, isopropyl alcohol. Other solvents that can be used for dissolving the self-assembled monolayer precursor include hexane, toluene, chlorinated hydrocarbons and ethers. The inked stamp shown in FIG. 2A is typically dried with a stream of an inert gas such as He, Ar, Ne or $N_2$.

Figure 2B:
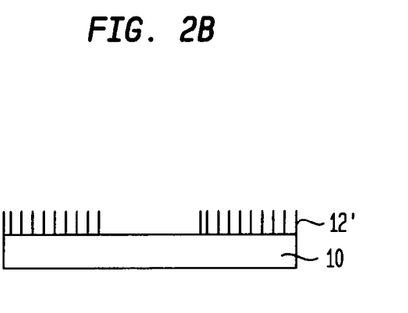

After inking the stamp 14 with the self-assembled monolayer precursor, the stamp 14 is then brought into intimate contact with the metal oxide 10. That is, the oxide surface is stamped with the stamp to transfer the pattern, e.g., the self-assembled monolayer 12. The structure that is formed after the pattern has been transferred from the stamp 14 to the metal oxide 10 is shown in FIG. 2B. The metal oxide 10 containing the self-assembled monolayer 12' is then heated under conditions that are capable of drying the self-assembled monolayer 12'. Typically, the heating is performed at a temperature from about 80° C. to about 120° C. for a time period from about 1 minute to about 5 minutes. More typically, this heating step is performed at a temperature of about 110° C. for about 2 minutes.

Figure 2C:
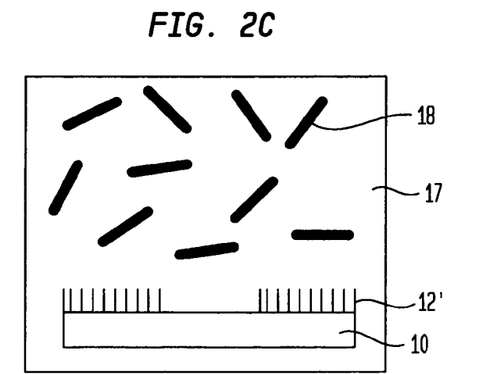

FIG. 2C shows the next processing step in which a dispersion 17 of carbon nanotubes 18 in a solvent is applied to the structure shown in FIG. 2B. The dispersion 17 of carbon nanotubes 18 is prepared using techniques that are well known in the art. Typically, the dispersion 17 of carbon nanotubes 18 is prepared by sonication of carbon nanotubes in an organic solvent (such as, for example, dichloroethylene, N-methylpyrolidone or dichloromethane) or in an aqueous solution that contains from about 0.1 to about 1% of a surfactant. Examples of surfactants that can be used in preparing the aqueous dispersion of carbon nanotubes include dodecylbenzenesulfonic acid sodium salt (DDS) and poly(oxyethylene)-substituted aromatic compounds such as Triton N-100 or Triton X-100.

Figure 2D:
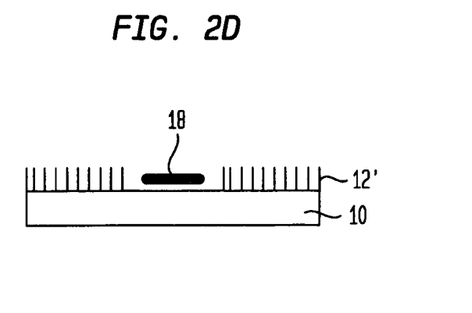

As shown in FIG. 2D of this embodiment of the present invention, the carbon nanotubes 18 are repelled by the self-assembled monolayer 12' and are deposited on the surface of the metal oxide 10 that does not include the self-assembled monolayer 12'. After deposition of the carbon nanotubes 18 onto the surface of the metal oxide 10 not including the self-assembled monolayer 12', any excess carbon nanotube is removed by rinsing the structure with an organic solvent such as dichloroethylene that is capable of dissolving carbon nanotubes that are not attached to the metal oxide 10. The sample may be mildly agitated to remove any CNTs on the previously stamped area. The above processing scheme leads to deposition of carbon nanotubes 18 on the area of the substrate 10 that was not stamped. Example 1 and FIG. 3 also correspond to this embodiment of the present invention.

Following deposition of the carbon nanotubes, device fabrication can be performed utilizing standard techniques well known in the art including lithography and metal deposition.

Figure 4A:
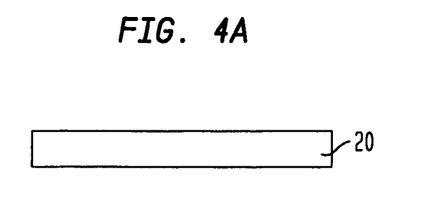
FIGS. 4A-4F are pictorial representations (through cross sectional view) illustrating a second embodiment of the present invention in which a patterned substrate scheme is used for the selective placement of carbon nanotubes.
Figure 4B:
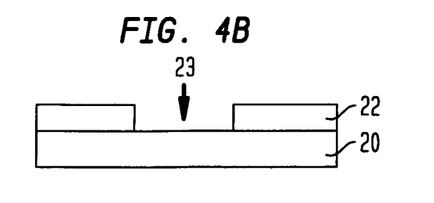

The second method of the present invention exploits the selective binding of the self-assembled monolayer precursor to metal oxides. This embodiment of the present invention, which is shown in FIG. 4A-4F, permits carbon nanotube FET fabrication on standard $SiO_2$ dielectric layers. Specifically, this embodiment begins with providing a substrate 20 that comprises an acidic oxide such as $SiO_2$ or other any non-basic oxide substrate. This is shown in FIG. 4A. Next, and as shown in FIG. 4B a patterned basic oxide 22, i.e., metal oxide, having at least one opening 23 is formed on a surface of the substrate 20. The patterned basic oxide is formed by a conventional deposition process such as, for example, chemical vapor deposition (CVD), plasma enhanced chemical vapor deposition (PECVD), evaporation, solution deposition, metalorgano deposition or atomic layer deposition. The thickness of the basic oxide layer is not critical to the present application. After deposition, standard lithography is used to create at least one opening in the basic oxide layer that exposes the underlying substrate 20. Alternatively, the patterned basic oxide 22 (herein after patterned metal oxide 22) can be formed using a patterned mask during the deposition of the metal oxide.

Figure 4C:
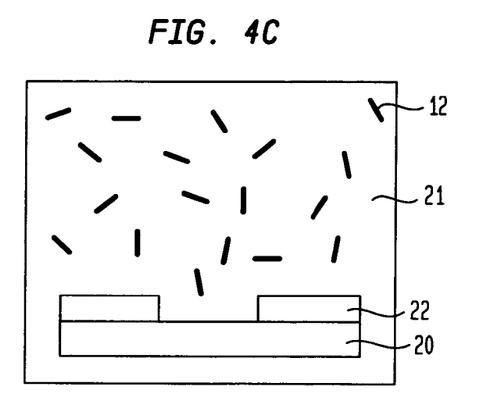
Figure 4D:
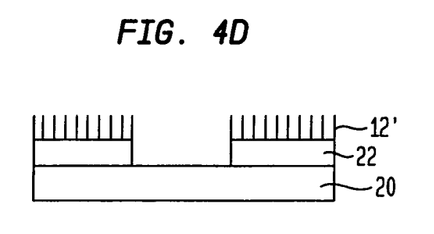

FIGS. 4C and 4D illustrate the structure during and after the formation of a self-assembled monolayer 12' on the surface of the patterned basic oxide 22, respectively. Specifically, FIG. 4C shows the structure during the application of a solution 21 containing the self-assembled monolayer precursor 12. The solution 21 including the self-assembled monolayer precursor and solvent is the same as described in the first embodiment of the present invention for inking the stamp. The application is typically performed by soaking the structure of FIG. 4B in said solution for a period of time from about 2 hours to about 24 hours. In this embodiment, and as shown in FIG. 4D, the self-assembled monolayer 12' binds only onto the metal oxide surfaces 22 and not onto the exposed surface of the substrate 20.

Figure 4E:
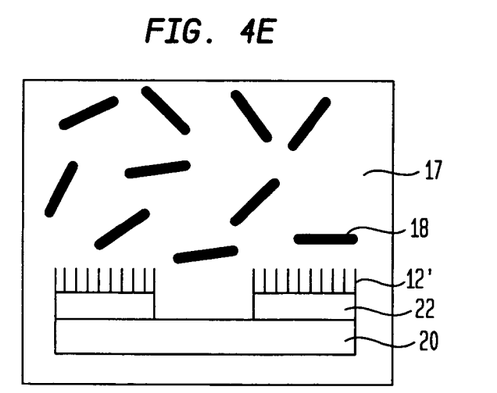
Figure 4F:
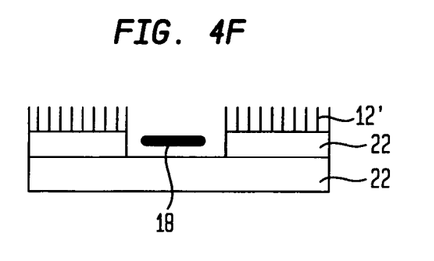

FIGS. 4E and 4F shows the structure during and after the formation of carbon nanotubes 18 onto the exposed surface of substrate 20. Nanotube dispersion is carried out as described in the first embodiment of the present invention. The resulting structure includes carbon nanotubes 18 formed on the exposed surface of the substrate 20. Example 2 and FIG. 5 also correspond to this embodiment of the present invention.

It is noted that the two schemes described above may be considered as negative patterning in which the carbon nanotubes do not bind to the area where highly hydrophobic self-assembled monolayers are present. If however, the self-assembled monolayer is terminated with a functionality that has affinity for carbon nanotubes such as an amine, carbon nanotube adsorption can be promoted rather than prevented. This embodiment of the present invention is shown in FIGS.

Figure 6A:
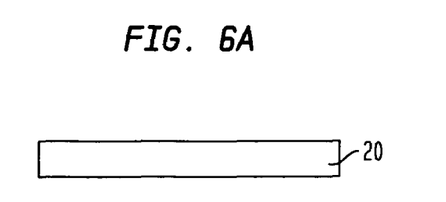
FIGS. 6A-6F are pictorial representations (through cross sectional views) illustrating a third embodiment of the present invention which is similar to the second embodiment except that the carbon nanotubes are attracted to a treated surface instead of the untreated surface as shown in FIGS. 4A-4F.
Figure 6B:
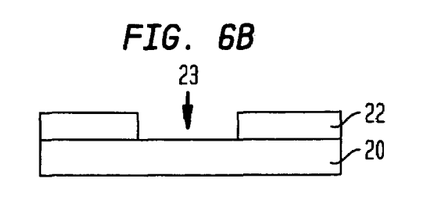
Figure 6C:
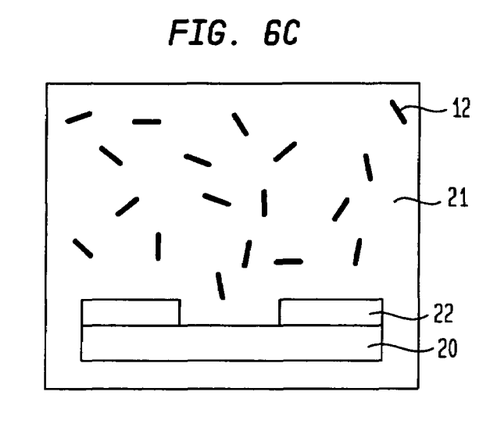
Figure 6D:
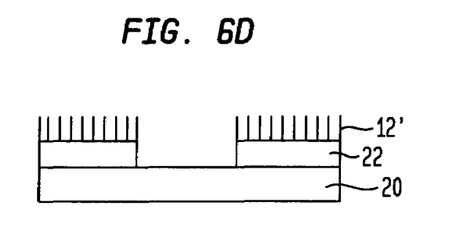

6A-6F. This embodiment of the present invention begins by first providing the structure shown in FIG. 6A. This structure comprises a substrate 20 that includes a non-basic oxide such as an acid oxide. Next, and as shown in FIG. 6B, a patterned metal oxide 22 having at least one opening 23 is formed on the surface of substrate 20 such that a surface portion of substrate 20 is exposed. The formation of the patterned metal oxide 22 shown in FIG. 6B is the same as described above in the second embodiment of the present invention. FIGS. 6C and 6D show the structure during and after contacting with a solution 17 containing a self-assembled monolayer precursor 12. Unlike the previous examples in which the self-assembled monolayer was hydrophobic, this example uses self-assembled monolayer precursors that contain a functionality which can react (or attract) the carbon nanotubes. In this embodiment, the self-assembled monolayer precursors comprise a compound of the following formula X—$R^2$-Z where X is a phosphonic acid group (—$PO_3H_2$) or a hydroxamic acid group (—CONHOH), Z is —$NH_2$, $NHNH_2$, —$ONH_2$, —ONHOH or —Ar(aromatic)-$N^+$ and $R^2$ is a straight chain alkyl containing from 1 to 22, a —$(CH_2)_n$ moiety in which n is from 3 to 21, alkoxy groups such as $(CH_2O)_x$ where x is from 3 to 21, aryl groups containing one to six phenyl, pyridyl, or thienyl groups, or mixed alkyl-aryl groups. A preferred precursor for this embodiment of the present invention is an aminoalkylphosphonic acid such as aminobutylphosphonic acid (ABPA). The solution 17 containing the self-assembled monolayer precursor includes a solvent as described in the second embodiment and it is applied as described above.

Figure 6E:
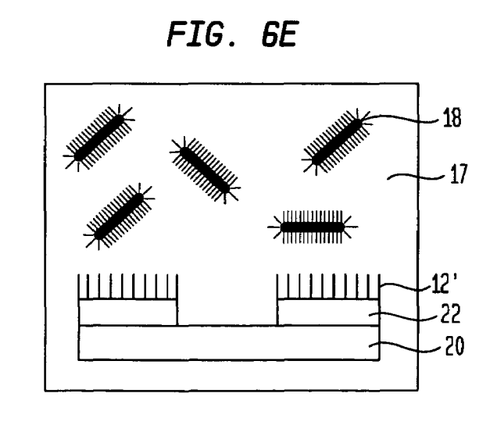
Figure 6F:
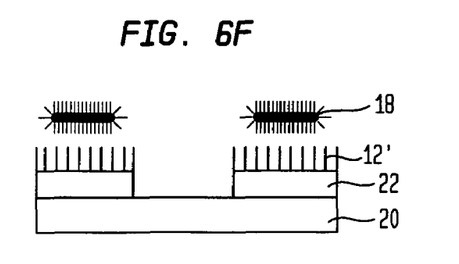

FIGS. 6E and 6F shows the structure during and after the formation of carbon nanotubes 18 onto the exposed surface of substrate 20. Nanotube dispersion is carried out as described in the first embodiment of the present invention. The resulting structure includes carbon nanotubes formed on the surface of the self-assembled monolayer 12'. In this embodiment, the carbon nanotubes are not formed onto the exposed surface of the substrate 20 since they react or are attracted to the self-assembled monolayer 12'. Example 3 and FIG. 7 also correspond to this embodiment of the present invention.

The following examples are provided to illustrate the various processing schemes of the present invention for the selective placement of carbon nanotubes.

EXAMPLE 1

Figure 3:
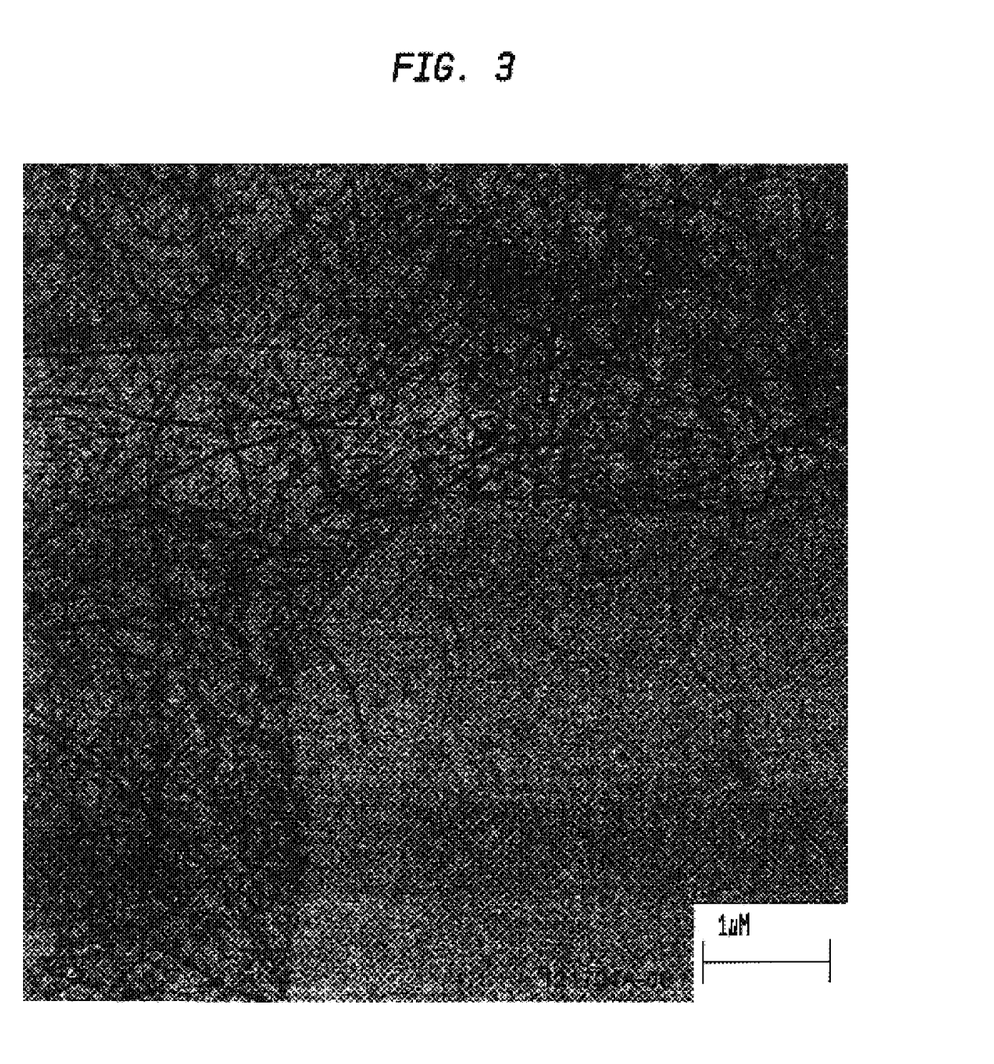
FIG. 3 is a SEM image of a 5.3 nm thick $HfO_2$ surface stamped with HDPA, following nanotube deposition using the technique illustrated in FIGS. 2A-2D.

A silicon wafer was coated with 100 nm of hafnium oxide by vacuum evaporation. A poly(dimethoxysilane) (PDMS) stamp with prepatterned features (indentations) was soaked with a 5 mM solution of hexadecylphosphonic acid in isopropyl alcohol and dried with stream of nitrogen. The PDMS stamp was then pressed against the substrate with hafnium oxide surface and held for few seconds, and then heated at 100° C. for one minute. The stamped substrate was then coated with a dispersion of carbon nanotubes in dichloroethylene and dried under stream of nitrogen. The substrate was then immersed in dichloroethylene and agitated mildly to remove any carbon nanotubes on the stamped area. This process lead to deposition of carbon nanotubes only on area of the substrate which was not stamped (exposed hafnium oxide surface) as shown in FIG. 3. No nanotube formation was observed in the stamped area.

EXAMPLE 2

Figure 5:
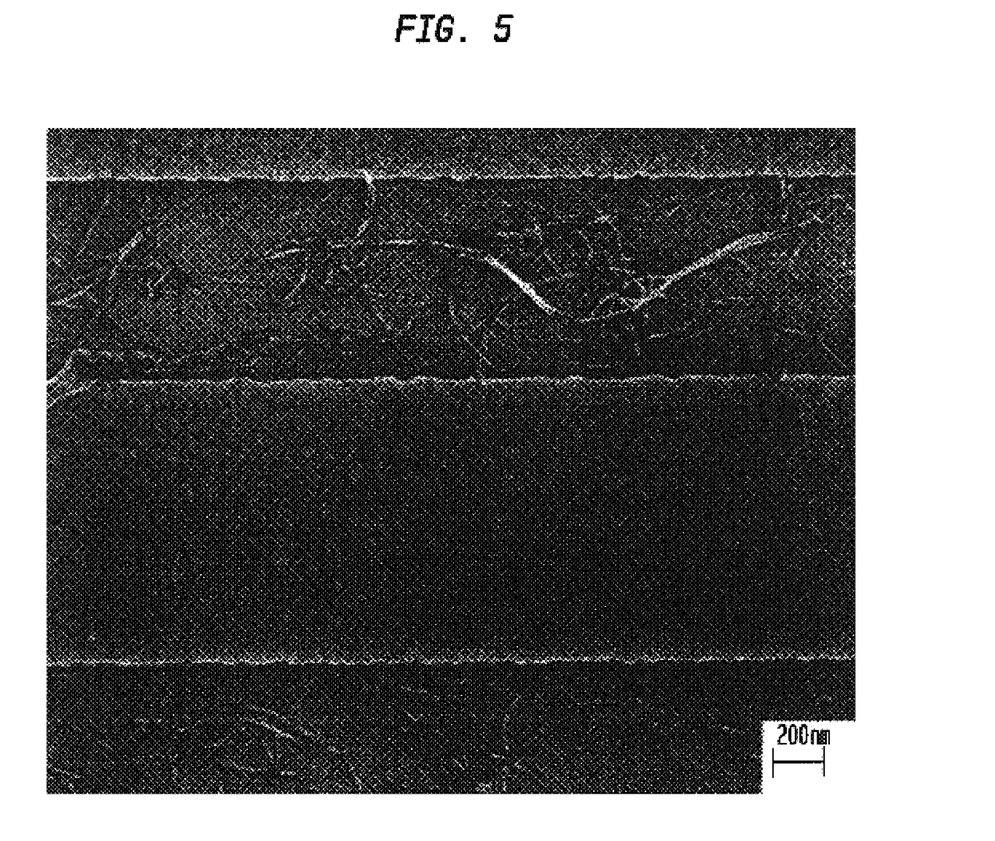
FIG. 5 is a SEM of patterned $Al_2O_3$ lines on $SiO_2$ that was prepared using the scheme illustrated in FIGS. 4A-4F.

A silicon wafer with 100 nm of silicon oxide on the surface was patterned with 10 nm of aluminum oxide by evaporation through a shadow mask. The substrate was then immersed in a 5 mM solution of hexadecylphosphonic acid in ethanol. After 2 hours, the substrate was removed from the solution and washed with ethanol and dried at 100° C. for one minute. A dispersion of carbon nanotubes in dichloroethylene was deposited on the substrate and dried under stream of nitrogen. The substrate was then washed with the solvent and dried at room temperature. In this example, carbon nanotubes were deposited on exposed silicon dioxide surface as shown in FIG. 5. In this example, the carbon nanotubes adhered to the cleaned $SiO_2$ surface and not to the treated $Al_2O_3$.

EXAMPLE 3

Figure 7:
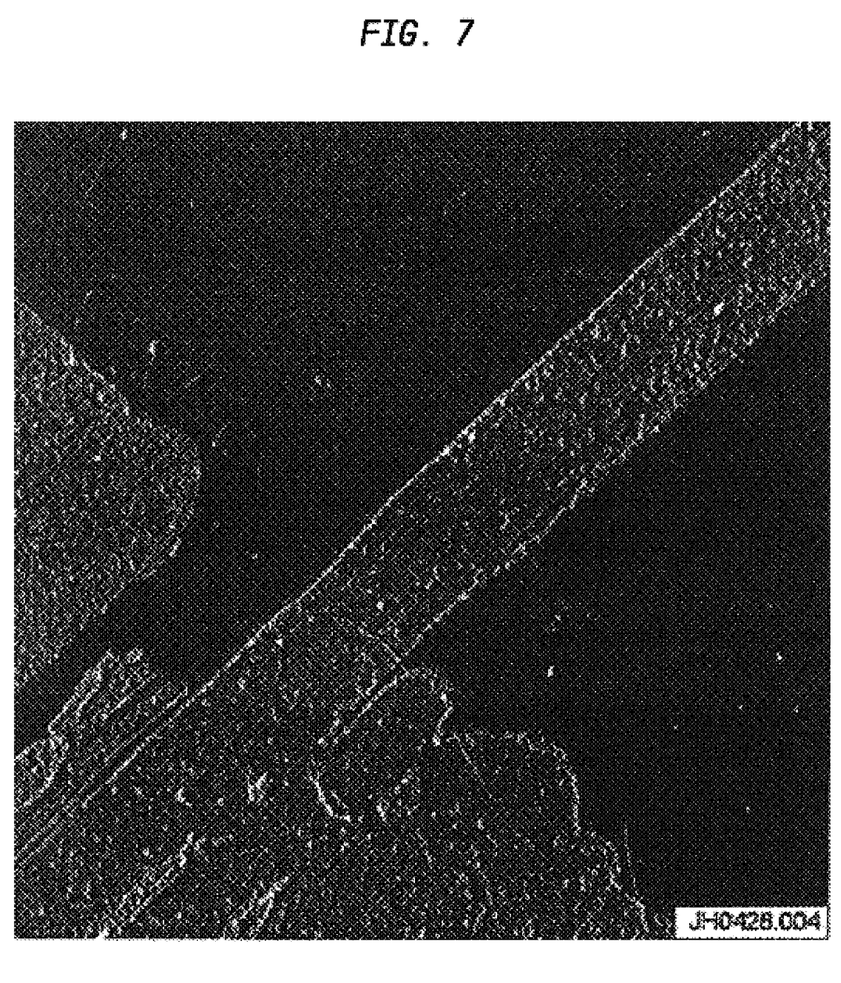
FIG. 7 is an atomic-force microscopy (AFM) image of patterned $Al_2O_3$ lines on $SiO_2$ that was prepared using the scheme illustrated in FIGS. 6A-6F.

A silicon wafer with 100 nm of silicon oxide on the surface was patterned, via standard lithography, with a 9 nm aluminum layer. The aluminum layer was then oxidized in an oxygen plasma. The sample was placed in a dilute (4 mM in methanol) 4-aminobutylphosphonic acid (ABPA) solution for several days. The ABPA binds only to the $Al_2O_3$ and not to the $SiO_2$. The sample was then placed in a suspension of carbon nanotubes in surfactant Triton-X and water for 4 hours. The substrate was removed from the solution and washed with excess solvent. Examination of the substrate shows that carbon nanotubes were found mainly on the areas where ABPA binds, that is, on the $Al_2O_3$ patterned lines (FIG. 7). The surrounding $SiO_2$ showed a very low density of carbon nanotubes or amorphous carbon.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A method of selective placement of carbon nanotubes on a predetermined surface comprising:
    selectively placing without utilizing silylation chemistry a self assembled monolayer comprising hexadecylphosphonic acid on an upper metal oxide surface of a substrate, said metal oxide comprising $HfO_2$ and said selectively placing includes providing a stamp containing a pattern of said self assembled monolayer and transferring said pattern of said self assembled monolayer to said metal oxide;
    depositing carbon nanotubes from a dispersion containing said nanotubes and dichloroethylene on a surface of said substrate not containing said self-assembled monolayer; and
    removing excess carbon nanotubes from a stamped area of said substrate by agitating in dichloroethylene.

* * * * *

UNITED STATES PATENT AND TRADEMARK OFFICE
CERTIFICATE OF CORRECTION

PATENT NO.        : 7,504,132 B2
APPLICATION NO.   : 11/044885
DATED             : March 17, 2009
INVENTOR(S)       : Ali Afzali-Ardakani et al.

It is certified that error appears in the above-identified patent and that said Letters Patent is hereby corrected as shown below:

Please delete line 20 of column 7 which currently recites:

"or —Ar(aromatic)-$N^+$ and $R^2$ is a straight chain alkyl con-"

and replace it with the following:

"or —Ar(aromatic)-$N_2^+$ and $R^2$ is a straight chain alkyl con-"

Signed and Sealed this
Sixth Day of December, 2011

David J. Kappos
*Director of the United States Patent and Trademark Office*